Feb. 21, 1939. C. H. OSHEI 2,147,777
MOTOR VEHICLE POWER TRANSMITTING UNIT
Filed April 26, 1935
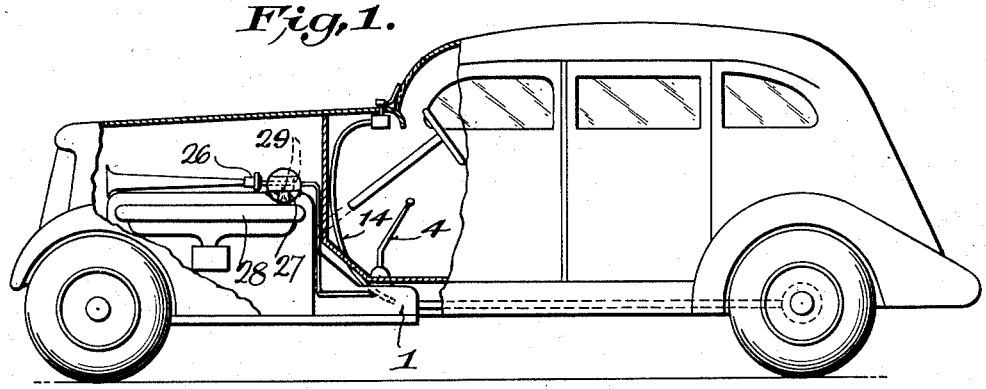
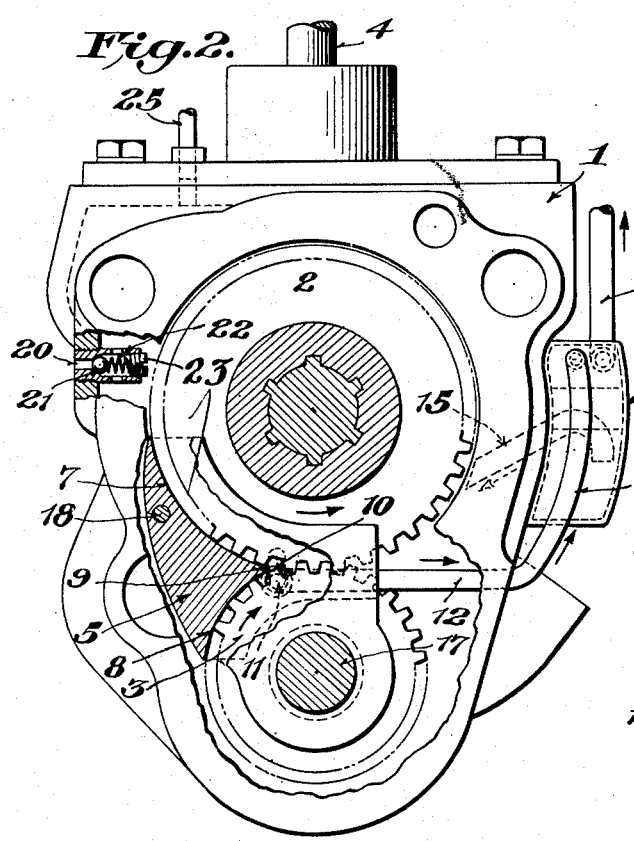
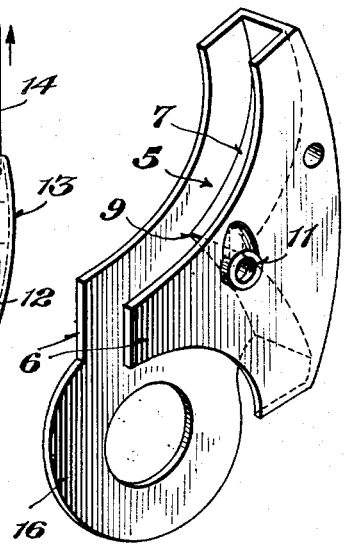
Inventor
C. H. Oshei, Patented Feb. 21, 1939

2,147,777

UNITED STATES PATENT OFFICE 2,147,777

MOTOR VEHICLE POWER TRANSMITTING UNIT

Charles H. Oshei, Detroit, Mich.

Application April 26, 1935, Serial No. 18,416

2 Claims. (Cl. 74—606)

This invention relates to a motor vehicle power transmitting unit in which there are intermeshing gears, and it has for its object to render such unit more efficient and quiet in operation.

In certain power transmitting units of the present day motor vehicle propelling mechanism, such as in the speed changing transmission mechanism, there is considerable noise transmitted to the passenger compartment of the vehicle due to the clattering and meshing of the several gear elements while in operation and during gear shifting action. To a certain extent this is due to the sound transmitting properties of the air within the transmission case, and in order to dampen this noise different attachments have been utilized, such as spring collars and plates.

The present invention comprehends the embodiment of means within the transmission case for exhausting or rarefying the air therein so as to provide a more or less vacuous condition around the point of noise generation for serving as a sound dampener, and further to provide a low pressure condition within the transmission case to act in preventing or reducing the leakage of lubricant through the shaft bearings.

Further, the invention has for its object to provide an improved accessory system for motor vehicles wherein the accessory is furnished with a steady and adequate supply of operating pressure, either positive or negative, or both In the drawing Fig. 1 is a diagrammatical view of the present invention as applied to the speed changing transmission mechanism of a motor vehicle.

Fig. 2 is a transverse sectional view through the transmission case more clearly disclosing the present invention.

Fig. 3 is a perspective view of the adaptor.

Referring more particularly to the drawing, the numeral 1 designates the gear case of the speed changing transmission unit of a motor vehicle, although it is not intended to restrict the adaptation of the inventive principles herein involved to that particular unit since it is equally adaptable to other physical embodiments employing intermeshing gear elements, such as the driving gears of the rear axle.

The gear case 1 is closed or sealed to the outside atmosphere and contains in its lower portion a certain quantity of lubricant in which the lower one of the intermeshing transmission gears 2 and 3 operates. The speed changing transmission mechanism within the case 1 may be of an approved form and may have the speed changing ratios determined by the gear shift lever 4. When the gears are in operation considerable noise is produced by their clattering and this noise is transmitted within the transmission case by the air therein as well as by the metallic parts thereof.

In one phase, the present invention comprehends means for evacuating the gear case of a large portion of the air content whereby a vacuous condition is provided therein to serve as a poor conductor and transmitter of the gear noises from within the case. This evacuation may be accomplished by a separate pump, although preferably it is accomplished by a case-embodied pump uniquely combined with the enclosed gears.

According to the present disclosure, this evacuating means adapts or converts the intermeshing power transmitting gears into pump elements for withdrawing air from the case. When thus serving as pumping elements the transmission gears cooperate with an adaptor chamber 5 which is designed to enclose those portions of the gear about their point of meshing engagement and for a distance in advance thereof. The chamber comprises side walls 6 fitting closely the sides of the gears so that the lubricant will serve to seal the clearance space therebetween. Between these side walls extends an arcuate wall 7, which is substantially concentric with the axis of gear 2 and a second arcuate wall 8, substantially concentric with the axis of the lower gear 3. The two walls 7 and 8 converge to an edge 9 terminating short of the point of mesh. These transverse walls 7 and 8 with the side walls 6 confine the teeth of the gears for a distance of two or more teeth, or to an extent sufficient to enable the teeth carrying the air from within the transmission case into a pressure compartment 10 which is located between the transverse edge 9 and the point of mesh. The positive pressure is built up considerably within this compartment due to the fact that both gears have their peripheral air pockets, between their teeth, in oil-sealed contact with the walls 6, 7 and 8 against leakage. Preferably at a point beyond the transverse edge 9, the compartment is provided with an outlet port 11 through which the air is expelled, along with any escaping oil that may be squeezed from between the mesh gears. The outlet port is connected by a conduit 12 to an air liberating chamber 13 containing copper wool, or any other type of liquid separator may be provided. The air herein is liberated from the oil and discharge to the atmosphere, or it may be carried off by a conduit 14 to a pressure operated accessory, if this is desired. As the commingled oil and air enter the liberating chamber the oil passes to the bottom of the chamber and forms a liquid seal for preventing the return flow of air to the transmission case but permitting excess oil to be drained thereinto, as by means of the return flow pipe 15. Consequently, while the oil may be pumped with the air from the case it is immediately returned thereto after the air is liberated in the chamber 13.

The pressure chamber 5 has one of its side walls provided with a mounting ear 16 which is designed to be mounted upon the fixed shaft 17 which supports the gear 3. This mounting serves to accurately dispose the transverse wall 8 concentrically with respect to the gear axis. A pilot pin 18 serves to mount the upper portion of the adaptor or pressure chamber to a fixed part of the transmission case.

An air inlet 20 may be provided with a normally closed valve 21 adapted to unseat by pressure differential and against the tension of a backing spring 22 in an automatic manner, or the air inlet may be manually controlled, to determine the maximum vacuum in the gear chamber of the case. The tension of the spring 22 may be regulated, as by turning the screw plug 23 with a screw driver, to determine the extent or degree of evacuation of the transmission case by the air displacing means. By reason of this air inlet 20, either automatically controlled or manually controlled, a sufficient volume of air may be furnished the gear chamber to enable the desired operation of the pressure actuated accessory to which it is connected by the conduit 14. By restricting the admission of the outside air to the gear chamber the desired vacuous condition within the latter may be maintained for dampening the sound vibrations.

By having the pressure chamber fitting into the tapering space in advance of the point of mesh only the peripheral portions of the gears are enclosed, thereby leaving the major portions thereof exposed to operate in their normal functioning as power transmitting elements with the lower gear operated in the lubricating bath. This enables the adaptor, when separate and removable, to be readily embodied or installed in the transmission case without re-construction to any material extent. The adaptor may, however, be permanently embodied in the mechanism where practical.

In thus reducing the pressure in the gear case, which may be accomplished to within a very few inches of absolute vacuum, the sound transmission is so impaired as to render the operation of the gears practically quiet. This tends toward a smoother performance of the gears and reduces the effort of shifting them for changes in driving speed ratios. By means of the adaptor, the larger transmission gears may be utilized as pumping elements for greater air displacement and without enlarging the capacity of the case.

Furthermore, since there is a high vacuous condition in the gear case the latter may be utilized as a vacuum storage chamber from which one or more suction operated accessories may be operated. For this purpose the case may be tapped, as at 25, through which connection may be effected with the accessory by a conduit similar to 14. The gear case therefore serves as a vacuum reserve chamber from which an adequate supply of low pressure is always available. The conduit 25, which leads to the suction operated accessory 26 may be provided with a branch passage 27 connecting to the intake manifold 28 as an alternate source of suction, suitable check valves 29 being provided to prevent fluid flow from the accessory or engine to the gear chamber, or in other words to dispose the dominating one of the two sources of suction in operative relation to the accessory to the exclusion of the lesser source.

While the invention has been described in detail for clarity, it obviously is not the intention thereby to restrict the same since the inventive principles here embodied are applicable to other physical embodiments without departing from the spirit or scope of the invention as set forth in the appended claims.

I claim:—

1. An automobile transmission casing enclosing a transmission having intermeshing gears, shafts supportng the same and passing through the walls of said casing, an adaptor in said casing comprising side walls joined by transverse wall portions and associated with two gears of the transmission in the casing at the side where they move into mesh for partially enclosing such gears, whereby to provide a pump chamber into which air is carried by the gear teeth from within the transmission casing to be discharged into the chamber as the gears intermesh, and means leading from the chamber and discharging outside the transmission casing so that the latter is maintained evacuated of a portion of its air content during operation of the gears to thereby resist the escape of lubricant from the casing along the shafts.

2. An automobile transmission casing enclosing a transmission having intermeshing gears, shafts supporting the same and passing through the walls of said casing, an adaptor in said casing comprising side walls joined by transverse wall portions and associated with two gears of the transmission in the casing at the side where they move into mesh for partially enclosing such gears, whereby to provide a pump chamber into which air is carried by the gear teeth from within the transmission casing to be discharged into the chamber as the gears intermesh, means leading from the chamber and discharging outside the transmission casing so that the latter is maintained evacuated of a portion of its air content during operation of the gears to thereby resist the escape of lubricant from the casing along the shafts, and means for regulating the extent of evacuation of said transmission case whereby a predetermined vacuous condition will maintain therein.

CHARLES H. OSHEI.